Dec. 28, 1965 R. F. HAZARD 3,226,691

DATA PROCESSING APPARATUS

Filed Jan. 22, 1962 2 Sheets-Sheet 1

INVENTOR
ROBIN FRANK HAZARD
BY Haseltine and Nydick
ATTORNEYS

Dec. 28, 1965 R. F. HAZARD 3,226,691

DATA PROCESSING APPARATUS

Filed Jan. 22, 1962 2 Sheets-Sheet 2

INVENTOR
ROBIN FRANK HAZARD
BY Hane and Nydick
ATTORNEYS

United States Patent Office 3,226,691
Patented Dec. 28, 1965

3,226,691
DATA PROCESSING APPARATUS

Robin Frank Hazard, Stevenage, England, assignor to International Computers and Tabulators Limited Filed Jan. 22, 1962, Ser. No. 167,535
Claims priority, application Great Britain, Jan. 26, 1961, 3,035/61
6 Claims. (Cl. 340—172.5)

This invention relates to data processing machines.

Data processing apparatus controlled by a stored programme of instructions must be provided with some arrangement which ensures that the instructions are selected and obeyed in the desired sequence. Various methods of achieving this are described in chapter 2 of Electronic Digital Computers, by C. V. L. Smith, published by the McGraw-Hill Book Co. In one form of instruction selection, the instructions of a sequence are stored in a corresponding succession of address locations of a store. The instructions are selected in sequence under control of a "next instruction counter" or NIAC. In another form of instruction selection, which is often used in machines employing magnetic drum stores, each instruction includes the address of the next instruction to be selected. The expression "sequential instruction" will be used herein to define those instruction selection systems in which the instructions are normally stored in sequential address locations and are selected by a sequencing device as distinct from those systems in which the address of an instruction forms part of the preceding instruction.

However, it is also necessary to be able to select instructions out of the normal sequence, for example, when a jump instruction is reached, or when entering and leaving programme sub-routines. This is done in sequential instruction machines by providing a circuit which allows the address in the NIAC to be modified under instruction control. This is quite straight forward when a simple jump forward in the main sequence of instructions is required. However, it can become very involved when the main programme includes a reference to several subroutines, each of which include jump instructions, or possibly reference to further sub-routines. In these circumstances, it is a very complex programming problem to ensure that the sub-routine programme is properly integrated with the main programme, so that whatever sequence of instruction is called for as a result of conditional tests during the course of the programme the correct entry and exit for the sub-routine can be maintained.

It is the object of the invention to provide an improved instruction selection system for computing and like data processing machines which are controlled by sequential instructions.

Figure 1:
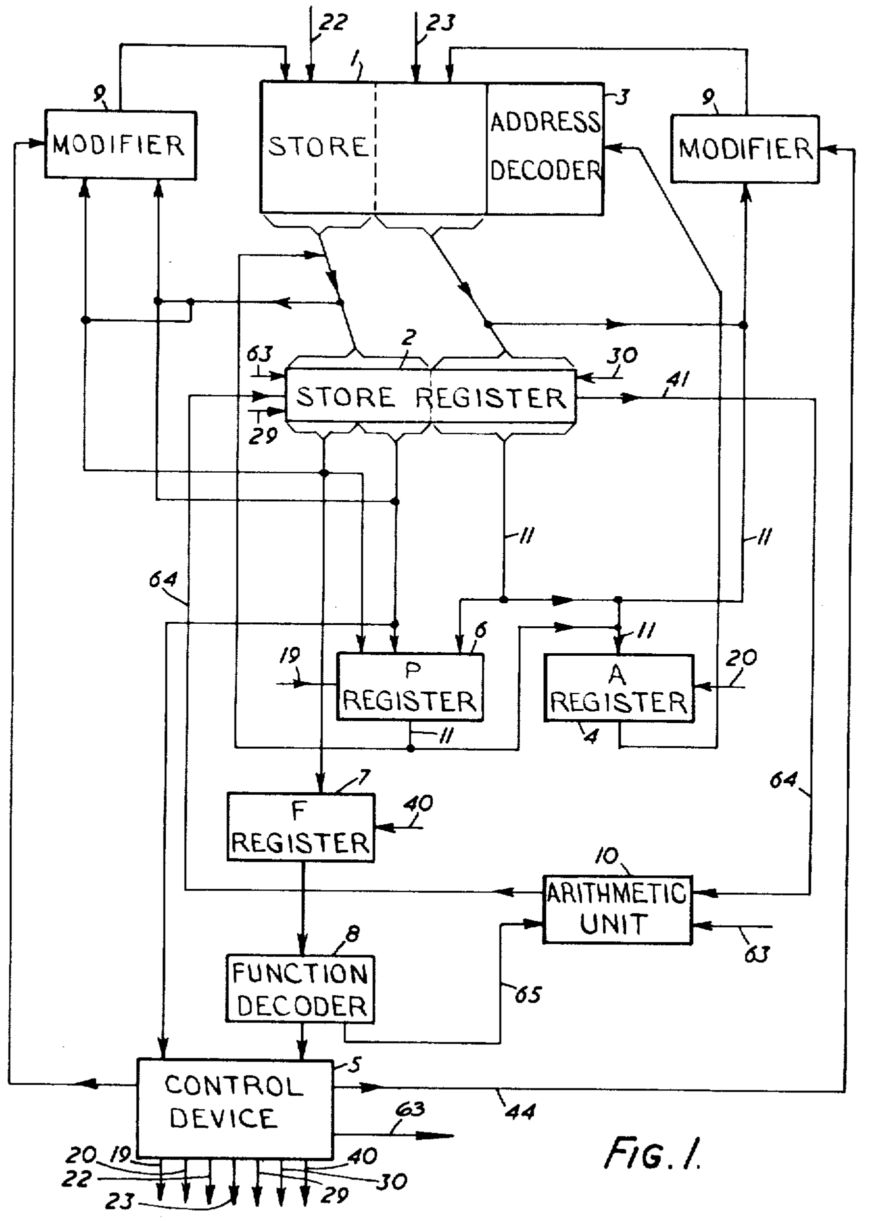
Figure 2:
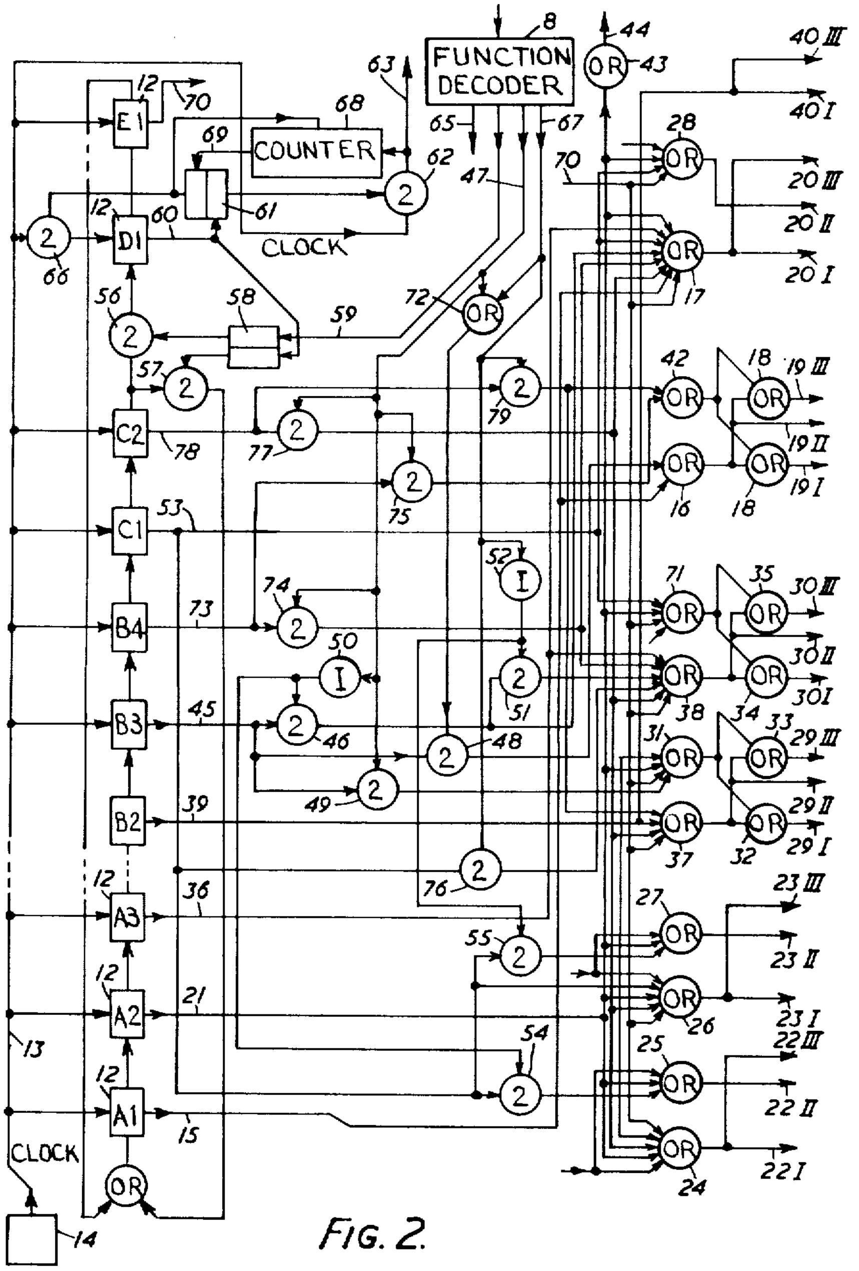

Apparatus embodying the present invention will not be described by way of example, with reference to the accompanying drawings, in which, FIGURE 1 is a schematic block diagram of a computing apparatus, and FIGURE 2 shows in schematic form the control arrangements for the computing apparatus.

Referring now to FIGURE 1, the computer has an immediate access store 1, employing magnetic cores or thin magnetic films as storage elements. Immediate access stores of this kind are well-known and may, for example, consist of a number of elements arranged in matrix formation, groups of the elements being individually addressable to form locations for the storage of a single data word. In practice, such a store may hold a large number, say 4,000, of words each consisting of perhaps 26 binary digits. Each word may represent a numerical value, an instruction, or what will be referred to as an address indicator.

Before considering the operation of the computer, it will be helpful to consider the form of the words stored in the storage device 1. Words which represent numerical values are normally used as operands in the computations to be performed under control of instructions. Hence, the binary digits of the words have no control significance in these cases.

A word which represents an instruction is used primarily to control the computer operations and the binary digits of such a word have control significance in dependance upon their positions within the word. Such instruction words are a modified form of a single address instruction. The six most significant digits of the 26 digit instruction word specify a function. This function field of six bits is further divided into two groups of three bits each. Each group of three bits can represent any decimal digit from 0 to 7. Thus, each function code can be written as the combination of two decimal digits. For example, the function code for the operation "Subtract the word in storage location X from the word held in arithmetic register Q" would, in the present example, be written as 13. The function field for this instruction will thus be coded 001011. The next seven bits of the instruction word will be referred to as the N field. They are used for counting and instruction modification purposes and their use in specific instruction sequences will be referred to in more detail hereinafter. The final thirteen binary digits of the instruction word, which will be referred to as the X field, are normally used to specify the address of a storage location in the store. However, the digits in the X field may also be used as an operand in certain modification operations. For simplicity, the values of each field will be given as decimal digits, but it will be appreciated that the actual instructions are coded in binary notation.

Each address indicator word consists of two parts, each of thirteen binary digits. The more significant part of an address indicator word may be used to represent the address at which another address indicator word is stored. The less significant part of an address indicator word may be used to represent the address at which an instruction is stored.

The manner in which the address indicators are utilised in controlling the computer may best be illustrated by considering how the computer obeys a sequence of instructions. The basic operation cycle of the computer is split into a number of steps, which will be called "beats." The maximum number of beats in a cycle is five. For convenience, these beats will be referred to by the letters A to E. The actual number of beats in a cycle depends upon the particular operation being performed during that cycle. For example, the D beat is used when the operation is arithmetic, but it may be omitted from the cycle for a non-arithmetic operation such as the transfer of a word from the store to a register.

The store 1 of the present apparatus is so arranged that a single location in which a word is stored may be selected for the performance of reading or writing by means of an address decoder 3 which is controlled in turn by a register 4. The register 4 will be referred to as the A register. As will become apparent, the store 1 is so arranged that the more significant and less significant halves of a word may be separately read into the store register 2 or written into the address location.

The contents of the store register 2 may be transferred into other registers under control of a controlling device 5 according to a programme dependent upon the number of beats actually used during an operating cycle, as will be explained hereinafter.

For the purpose of the present explanation the register into which digits may be transferred from the store register 2 are the A register 4, a P register 6 and an F register 7. The A register 4 is used to hold a 13 binary digit address which may be derived from the X field of an instruction or from either part of an address indicator word. The contents of the A register are constantly applied to the address decoder 3 which selects a drive line or lines in the store 1 associated with the word storage location specified by the binary digits in the A register.

The P register is used to hold the 13 binary digits comprising the address of the location in which is stored the address indicator word which is currently in use. The F register is used to hold the binary digits of the F field of an instruction and the function represented by these digits is decoded in the conventional manner by a function decoder 8 and the decoded function is applied to the control device 5.

The arrangement of the store is such that a recirculating loop is provided for each half of a word read out with the result that the word may be re-written into the storage location from which it was read. Each recirculating loop includes a modifier 9 which is in turn controlled by the control device 5 and which may be rendered effective to add unity to the part of the word being recirculated.

Before considering the operation of the individual parts of the computer in detail the functioning of the machine during a typical complete cycle will first be considered. During the A beat of the cycle, the address of the current address indicator is read into the A register from the P register. The address is decoded by the decoder and the current address indicator is read out from the store in the store register. The second part of the address indicator is then read from the store register into the A register. This second part in fact represents the address of the next instruction required in the programme sequence. During the same beat the address indicator is read out from the store register to a modifier circuit which adds 1 to the second part. The address indicator is then re-entered into the same storage location as that from which it was read. Thus the effect of the A beat of operation is that the address of the next instruction is entered into the A register, and the next instruction address count of the current address indicator is increased by one.

During the B beat of the cycle, the required instruction is read from the store into the store register, under control of the address which was entered into the A register during the A beat. The X field of the instruction is then entered into the A register, and the function field is entered into the F register. The instruction is also read back from the store register into the address from which it came, via the modifier circuit. If the instruction is the unconditional jump function and the value in the N field is 127, then the instruction is returned to the store in unmodified form. For most other instructions, if the value of the N field is other than 0 or 127, then the X field is modified by the addition of 1. Unless the value in the N field is 0 or 127, this value is also modified by the addition of 1 during the return of the instruction to the store.

During the C beat a further readout from the store to the store register takes place. This places in the store register the word whose address is specified by the X field of the instruction, which was put into the A register during the preceding beat. This word will also be re-entered into the store unmodified at the original address during this beat.

During the D beat, which is used for arithmetic operations, the contents of the store register 2 are shifted serially into an arithmetic unit. This unit is arranged in the conventional manner under control of the control device 5 to perform to necessary computations in accordance with the decoded functions from the function decoder 8. Such functions may require that, for example, the word shifted out of the store register 2 is added to a value stored in a register within the arithmetic unit, the result then being replaced in a further register in the arithmetic unit. Alternatively, the function to be performed may require that the result of a computation is placed in the store register 2. In the latter case the result word will be shifted serially from the arithmetic unit 10 back into the store register 2.

Thus at the end of the D beat the store register 2 may contain a different value from that which was present at the beginning of the beat.

During the E beat of the cycle, the value now in the store register is returned in unmodified form to the store 1 at the address specified by the current instruction.

To illustrate the operations which may be performed during the D and E beats, suppose that the function code of the present instruction is 02 and that this code requires the word in the storage location specified by the instruction to be added to a value stored in one of the registers of the arithmetic unit and the result to be replaced into the location from which which the operand specified by the instructions was derived. In this case the operand which is held in the store register 2 at the beginning of the D beat, is shifted into the arithmetic unit and the result of the computation is shifted back into the store register 2 at the end of the D beat. This new value is now returned unmodified to the same storage location during the E beat.

The E beat is the last one of this cycle, so that it is followed by the A beat of the next cycle. During this beat the current address indicator will again be read out from the store, and since the second part of the address indicator was increased by 1 when it was re-entered into the store, the required next instruction will be selected during the following B beat.

The operations performed by each of the component parts of the computer will now be described in greater detail.

The storage device is arranged so that the selection of an address by the A register 4 and the address decoder 3 allows a unique storage location to be interrogated. An interrogation cycle consists of a read phase followed by a write phase in order that a word may be separately read or written in a selected location. The store may be regarded as comprising two identical storage devices each of which stores half a word and both of which consist of corresponding addressed storage locations. Storage devices operating in this mode and having provision for recirculating a word which has been read out are well-known. For example, a storage device of this kind is shown and described in United States Patent No. 2,910,674 in which a location consists of two groups of storage cores, one group, the storage group proper, being used to store a number of binary digits and the other group being used as auxiliary cores for the entry of binary digits to be stored. In order to read out the storage group, a read driver is conditioned by an initiating signal to reset the storage cores. A further initiating signal, termed a sampling signal, is applied to condition out-put amplifiers in order that the digits previously stored may be passed to output lines of the store. A further group of write drivers is conditioned either by the output digit signals from the store, or by signals representing new digits to be stored, to enter these digits into the auxiliary core group. At the end of the store interrogation cycle, the digits entered into the auxiliary group are transferred to the storage cores. Thus a storage device of this kind may be considered to be operated under three initiating conditions. The first may be considered as a resetting signal and the second as a reading control signal. Writing of data into the store is initiated by the data signals applied to the write drivers.

An arrangement such as that described above may be used in a slightly modified form for each half of the store 1. The modifications required are in the resetting and writing arrangements. The read drivers are associated with a particular storage location by decoding of the address in the A register 4 by the address decoder 3. For the sake of economy it is preferred that the switching network for this decoding purpose is interpolated between the read drivers and the selected address and that the read drivers are switched into operation in response to a single initiating signal derived from the cycle control device which is described hereinafter. It will be appreciated that any suitable known apparatus for switching the driving current to a specified storage location may be used for this purpose. The second modification provides a single data transfer path to the write drivers and requires that the write driver are rendered effective by a separate initiating signal in much the same way as in the case of the read drivers.

It will be recalled that a modifier 9 is interposed in each of the circulating loops of the storage device. Thus in the present case using a storage device similar to that described above, the modifiers 9 would each be incorporated in the circuit between the output sense amplifiers of the store and the input to the write drivers. The modifiers 9 are conveniently fast-carry parallel adders in which the output is available substantially simultaneously with the application of input values. Where it is required to add unity to a value passed through the adder, it is merely necessary to provide a signal on a "one" line to the modifier from the control device 5.

The effect of this signal is to simulate an input of the value "one" on one input to the adder, while the value represented by the signals appearing on the recirculating loop lines are applied to the second input to the adder. Thus the sum value appearing on the output lines to the adder is one greater than the value applied over the second input. By using a very fast adder for this purpose, the delay introduced in the recirculating loop may be made negligible in relation to the total operational cycle time of the storage device. Fast parallel adders operating in this way are known and one such added has been described in a paper entitled "Parallel Arithmetic Unit Using a Saturated Transistor Fast-Carry Circuit" by T. Kilburn and D. G. B. Edwards and D. Aspinall in the Proceedings of the I.E.E., volume 107 at pages 573 et seq.

Hence, it will be apparent that resetting of a store location is accomplished in response to a first initiating signal; reading out of the location is accomplished in response to the application of both the first and second initiating signals and writing into the location is accomplished in response to the third initiating signal. In each case the particular location which is interrogated in this way is specified by the contents of the A register 4 and the modification by the addition of unity of a half-word during its recirculation is accomplished by the application of the add one signal to a modifier 9 by the control device 5.

Each of the A, F and P registers 4, 6 and 8 respectively resembles a single storage location as used in the storage device and comprises two groups of cores with read and write drivers recirculating loops and sense amplifiers. The number of cores in each group, of course, is determined by the number of binary digits to be registered. The output lines from the registers are arranged to form transfer paths as indicated in FIGURE 1. Thus, for example, one path 11 is common to the output lines of the P register 6 and the store register 2 and to the input lines of the P register 6, the A register 4, the store register 2 and one of the modifiers.

Transfers between various ones of the registers are therefore controlled by the initiating signals applied to the registers in any single operating phase of the cycle beat. The initiating signals are applied to the registers by groups of control lines from the control device 5. For example, the group control lines for the P register 6 are indicated by the line referenced 19 in FIGURE 1. Similar control line groups are provided for the other registers and for each half of the store. It will be appreciated, however, that each group may contain up to three initiating lines as previously noted. For the sake of convenience the initiating signals will be termed I, II and III as follows: the first initiating signal, applied to render effective the read drivers to reset the storage cores of a register is termed initiating signal I; the second, which allows the sense amplifiers to operate the pass signals to the register output lines is termed II, and the third, which allows signals appearing on the input lines to be rewritten into the register termed III. The individual lines in the control groups are referenced in FIGURE 2 with the appropriate suffix to denote the particular initiating signal carried.

In order to permit a transfer over the path 11 only from the P register 6 to the A register 4, the control device 5 passes initiating signals I, II and III to the P register 6 over control group 19 and initiating signals I and III to the A register 4 over control group 20. Hence, any other registers connected to the transfer path 11 are unable to be reset because no I signal is applied to them and similarly they are prohibited from writing any signals appearing from their input lines becauses they do not receive a III signal. The P register 6, however, receives all three initiating signals and therefore the information registered by it is allowed to pass to the transfer path and this information is also re-entered over the recirculating loop. The A register 4, however, is reset by the I signal but no output is permitted in the absence of the II signal. Consequently there are no signals applied over the A register recirculating loop. Instead, the incoming signals over the path 11 are entered into the A register because the associated write drivers are energised by the III signal.

It will become apparent that this method of controlling the transfers of signals over transfer paths linking the various registers is used throughout the apparatus shown schematically in FIGURE 1.

The store register 2 is indicated in FIGURE 1 as a single block but in fact this register comprises two information registers of similar length operating in parallel. The first of these operates in a generally similar manner of the A, P and F registers 4, 6 and 7 described above and is used for parallel information transfers. The second register is a core shift register arranged to permit the parallel input and output of information.

Shift registers arranged in this way have previously been proposed and information stored in such a register is shifted serially out of the register to an output line 41 under control of a train of shift pulses supplied to a shift pulse applied to a shaft control line 63. The parallel entry and read-out of information is conveniently arranged by using initiating pulses from the control device 5 to control gates to permit setting of the shift register stages in response to signals on the parallel input lines to the store register 2 and to permit resetting of the shift register stages in order to read-out to the parallel output lines of the register. The shift register part of the store register 2 is required to be effective only for the purpose of transfers to and from the arithmetic unit 10, and it will be realised that it may be convenient to permit reading into and out of this part only immediately before and after the arithmetic beat D for the operating cycle. Such control may, for example, be achieved by gating the input and output of this register by an arithmetic operation control signal in association with appropriate beat control signals in a manner that will become apparent hereinafter.

The various transfers between the various registers and the store are controlled by the control device 5 which is, in turn, conditioned by the output lines from the function decoder 8. FIGURE 2 shows a schematic form the manner in which the control device 5 controls the operation of the apparatus of FIGURE 1. The control device 5 consists of a number of stages 12 arranged to form a stepping register and having a gating network connected to the output lines of the stage 12 to permit the passage of initiating signals to the various registers to control the various transfers required during the beats of the operating cycle. In the conventional manner, the stage 12 of the stepping register are capable of assuming one of two stable states and all but one stage are normally in a first one of these states, the remaining stage being in the second, opposite, state. The stages are coupled in sequence by transfer paths and all the stages 12 are connected to a shift control line 13. A conventional clock-pulse generator 14 is connected to the shift pulse line and the stepping register is arranged to respond to the clock pulses on the line 13 to switch each of the stages to the second state in succession, the second stable state being passed in this manner successively along the stages 12 of the stepping register. As will become apparent the stepped signal is recirculated from the last stage 12 back to the first stage 12 and provision is made, where, for example, there is to be no arithmetic operation during the operational cycle, for returning the stepped signal back to the first stage 12 at the end of the C beat of the cycle.

For the sake of clarity the blocks representing the stages 12 are further referenced to indicate the beats and the steps within each beat which are controlled by the outputs from the stages 12. For example, the first three stages 12 are concerned with the A beat, which is performed in three steps. Consequently, the first three stages 12 are additionally referenced A1, A2 and A3 respectively. The output line of the stages 12 are applied to various gates and the following convention has been observed in FIGURE 2. All gates are shown as circles and the marking within these circles indicates the gating function performed. For example the marking "OR" signifies that the gate concerned is a conventional OR gate; a numeral within the circle indicates that the gate is a conventional AND gate having the number of inputs indicated, all of which are required to be carrying a signal to provide an output from the gate; and the letter "I" within the circle indicates that this gate is a conventional inverting gate, which passes an ouput only if there is no signal applied to the input line.

The initiating signal control lines are shown separately in FIGURE 2 arranged in groups according to the particular register or store section with which they are associated, and where an initiating signal is provided by more than one output line from a stage 12, an OR gate is provided between the output lines. For example, groups 22 and 23 are the initiating groups associated respectively with the more significant and less significant halves of the store 1. The initiating lines within the groups are referenced in FIGURE 2 with suffix I, II or III to indicate the particular initiating signal carried. Thus, the I and III signals of group 22 are controlled by an OR gate 24; the II signal of this group is controlled by an OR gate 25; OR gate 26 controls the I and III signals of group 23 and OR gate 27 controls the II signal of group 23. Hence, the gates 24 and 26 respectively control the operations of writing into the more and less significant halves of the store 1 while the gates 25 and 27, when opened concurrently with the gates 24 and 26 allow reading out and preservation of the information from the store.

Similar arrangements are made for the store register 2, which has two groups 29 and 30, of initiating signal lines, associated respectively with the more and less significant halves of the register. Considering the more significant half of the register 2, the initiating signal 29 II is controlled by an OR gate 32 and the signal 29 III by an OR gate 33. An OR gate 31 controls both gates 32 and 33, so that if the gate 31 is conditioned the signals I and III are passed to allow writing into the register. A further OR gate 37 similarly controls the gates 32 and 33 and also passes a signal to the 29 I line, so that conditioning of the gate 37 allows information to be read out and preserved. The less significant half of the store register 2 is controlled in a somewhat similar manner. The I and III signals of groups 30 are primarily controlled by OR gates 34 and 35 respectively. An OR gate 71 controls these gates and also passes a signal to the 30 II line to allow reading and preservation.

The P register 6 is controlled by the initiating group 19, and as in the case of the store register, OR gates 18 are used to control the lines I and III while further OR gates 16 and 42 control operations of reading and writing respectively.

The A register, which is controlled by initiating group 20 has an OR gate 17 which controls a writing operation and also has a further OR gate 28 which allows reading and preservation if it is conditioned concurrently with the gate 17. Finally the F register is conditioned to receive information transferred to it by the passage of initiating signals I and III of a group 40 from a line 39.

The operation of the apparatus described with reference to FIGURE 1 will now be illustrated by consideration of a numerical example and a detailed description of the control operations performed by the control device shown in FIGURE 2. For the sake of clarity and in order to avoid confusion between the reference numerals and the numerical values to be given in the following description, numerical values given as examples will be set forth in four-digit form, e.g. 0018, although it is to be realised that in practice that the values will actually occur in the apparatus in binary coded form, as previously described.

For the purpose of the following description it will be assumed that a new operational cycle is about to start, and the stepping register shown in FIGURE 2 has been stepped so that an output is present on output line 15 from the first stage 12 of the register. It is further assumed that the address indicator in current use is stored at address location 0018 in the store and that the last instruction to be used was held in address location 0050 of the store. The apparatus is now about to perform the first step of the A beat of the new cycle.

*A beat.*—The P register holds the value 0018 which is the address of the current indicator. The signal on line 15 is applied to OR gates 16 and 17 to cause the value from the P register 6 (0018) to be read out over transfer path 11 (FIGURE 1) previously described and to allow the A register to receive this value. After the next clock pulse, the output on line 15 from the first stage 12 ceases and the second stage 12, controlling the second step (A2) of the A beat, produces an output on line 21. The output on this line is applied to the OR gates 17, 28, 24, 25, 26, 27, 31, 71 and a further OR gate 43. This last gate 43 permits the signal to pass to a modifier control line 44 which conditions the modifier 9 (FIGURE 1) associated with the less significant half of a word to add unity during recirculation and preservation of the word read from the store. The remaining gates allow reading from the A register 4 to select required storage location (0018) reading out and preservation of this selected location and writing of the location into the store register 2. The third stage 12 (FIGURE 2) is rendered effective after the next clock pulse to produce an output on line 36. This output is applied to OR gates 38 and 17 and causes the less significant half of the store register contents to be read out and written into the A register.

Thus the effect of the A beat is to cause the address indicator in storage location 0018 to be read into the store register, and the second part of this, which is 0051 is read into the A register. The address indicator is returned to the storage location 0018 with the second part modified with the addition of unity making this part 0052.

*B beat.*—The next clock pulse renders the next following stage 12 effective for the first step of the B beat. This stage is omitted from FIGURE 2 for the sake of clarity but the output is applied, in much the same way as before, to the OR gates 17, 28, 24, 25, 26, 27, 31, 34, and 35 to allow the contents of the A register to select a new storage location, and to allow the selected location to be read out into the storage register. Thus, at the end of this step, the store register holds the contents of the storage location 0051 specified in the A register at the end of the A beat. It is convenient for the purposes of the present explanation to assume that the programme instruction contained in this storage location has the value 0032 in the function field, 0000 in the N field, and 0061 in the X field, for example. This means that the word stored in location 0061 is to be added to a word in a register contained within the arithmetic unit, and the result is to be returned to the store. The next step of the B beat is controlled by the stage 12 (FIGURE 2) additionally referenced B2, which now produces an output on line 39. This output is applied to condition OR gate 37 to allow reading out from the more significant half of the store register and is also applied directly to the F register group 40, thereby allowing writing into this register. Thus, the function field digits 0032 are transferred to the F register and are now decoded to provide the necessary control voltages to effect the addition. The operations performed during the last two steps of the B beat are dependent upon the function required by the instruction, and a logical gating network is conditioned by decoded outputs from the function decoder 8 (FIGURES 1 and 2) as the result of the entry of the function field digits into the F register during the preceding step. For this purpose a pair of control lines 47 and 67 (FIGURE 2) are provided from the function decoder 8 to the control device and in the present case the function digits are such that neither of these lines carries an output signal. The third step of the B beat causes an output line 45 from the appropriate shifting register stage 12 to carry a signal. The signal is applied to AND gates 46, 48 and 49. The gates 48 and 49 are closed in the absence of signals on control lines 47 and 67 while the gate 46 is opened by the influence of an inverter 50 connected between control line 47 and the AND gate 46. A resultant output from the gate 46 is passed to a further AND gate 51 and also to the OR gate 17 associated with the A register. The AND gate 51 is open in the absence of an output on control line 61 due to the presence of an inverter 52 between the control line 61 and the gate 51. A resultant output from the AND gate 51 is applied to OR gate 38 to allow reading out from the less significant half of the store register.

The following step of the B beat is ineffective in the absence of signals on the control lines 47 or 67. Thus, at the end of the B beat the X field digits have been transferred to the A register. The instruction has also been returned to the address in the store from which it was taken.

*C beat.*—In order to carry out the instruction specified by the F register, the word in storage location 0061 is now to be read into the store register. The location 0061 will be assumed to contain the binary equivalent of, say, the number 0734. The next stage 12 of the shifting register to produce an output is that associated with the first step of the C beat and the output occurs on line 53. This output on the line 53 is applied to OR gates 17 and 28 to allow read out of the required storage location address from the A register to select this location and also to OR gate 71. The line 53 is also connected to two AND gates 54 and 55 associated respectively with the more and less significant halves of the store and store register. The gates 54 and 55 are controlled by the function control lines 47 and 67 respectively and are open in the absence of signals on these lines. In the present case, therefore, the AND gates 54 and 55 are both open and resultant signals pass to OR gates 24, 25, 26, 27 and 31. This causes reading out from the selected location of the store into the store register. The second step of the C beat is ineffective in the absence of a signal on the control lines 47 and 67 so that the contents (0734) of the location 0061 are now in the store register.

At the end of the C beat the shifting register stage 12 referenced C2 will be producing an output. The transfer path from this stage includes two AND gates 56 and 57. These gates are controlled by a trigger 58 which is normally set to maintain the gate 56 closed and the gate 57 open. The trigger 58 is controlled by a line 59 from the function decoder 8 which carries a signal whenever the function code indicates that an arithmetic operation is to be performed. Thus, in the present case the trigger 58 is unset in response to this signal and the state of the gates 56 and 57 is reversed, thus allowing the D beat to be performed by connecting the shift transfer path from the stage 12 associated with step C2 to that associated with step D1.

*D beat.*—After the next clock pulse, the D1 stage 12 produces an output on a line 60. This output is applied to reset the trigger 58 to its normal state and is also applied to set a further trigger 61. Setting of the trigger 61 opens a gate 62 to allow clock pulses from line 13 to pass to a shift control line 63 associated with the shifting register part of the store register 2. In this connection it will be realised that the entry of information into this part of the register may be controlled by gating under control of signals on lines 59 and 53. The shifting signals on the line 63 allow the contents of the store shifting register 2 to be circulated serially through the arithmetic unit 10 (FIGURE 1) over the path 41. The operation of the arithmetic unit 10 is controlled in the conventional manner by output lines from the function decoder 8, these lines being represented schematically by a path 65. In the present case the sum from the arithmetic unit is returned to the store register 2. Since serial shifting is controlled by clock pulses, it will be apparent that the number of shifting pulses must be controlled and that during the period required for this shifting operation the stepping register within the control device must be inhibited from operating. Thus, the trigger 61 maintains a gate 66 closed to inhibit stepping of the control device stepping register. At the same time the pulses applied over the line 63 are counted by a counter 68. When the required number of pulses has been registered, the counter 68 provides an output signal over a line 65 to reset the trigger 61. Resetting of the trigger closes the gate 62, re-opens the gate 66 and resets the counter 68 to zero. Hence, the next clock pulse occurring on line 13 steps the control device stepping register to the next following stage 12, which controls the E beat of the cycle. During the D beat, therefore, the sum value resulting from the addition within the arithmetic unit, which may, for example, be the value 0803 is returned to the store register.

*E beat.*—The result (0803) held in the store register is now to be entered into storage location 0061, replacing the value (0734) which was previously registered there. During this beat the stage 12, referenced E1 (FIGURE 2), produces an output on a line 70. Again it will be realised that the shifting register part of the store register 2 may be selected for reading out under control of gating signals derived from the lines 70 and 59. The line 70 is connected to OR gates 17 and 28 to allow the A register to select the storage location 0061 and to OR gates 31, 37, 38 and 71 to allow the store to write in the new value transferred from the store register.

The foregoing sequence of events represents a complete operation cycle and the transfer path from the final stage 12 of the control device stepping register is connected back to the first stage 12. Thus, after the next occurring clock pulse on line 13 a new operation cycle will be started and the first stage 12 will again produce an output on line 15. At the end of the foregoing operating cycle it will be seen that the P register still holds the address, 0018, of the next instruction address indicator, the contents of which have now been modified to 0052. The second operation cycle now follows.

*A beat (2nd).*—The steps of the A beat as previously described are repeated. The address of the current address indicator, 0018, is transferred from the P register to the A register. The contents of storage location 0018 is again read into the store register and the second part of the address indicator, which is now 0052, is read into the A register. The address indicator is then returned to storage location 0018, with the second part modified to 0053. The B beat then follows as previously described to read the next required instruction from the specified location of the store.

*B beat* (*2nd*).—The setting of the A register causes the instruction in storage location 0052 to be read into the store register, thus continuing the sequence from the previously selected instruction which was in storage location 0051.

The selection and obeying of instructions will continue as described through successive operation cycles as long as control is to remain with the address indicator in storage location 0018. A different address indicator will not be selected until an instruction is required at an address which does not follow in the current sequence.

It will be appreciated that the address indicator control is similar to that exercised by a conventional NIAC counter as long as instructions are being selected in sequence. This arrangement does dispense, however, with the need for a counter and the associated circuits, since any storage location of the main store may be used for storing an address indicator. The major advantage of the address indicator system is the simple manner in which breaks in the instruction sequence may be dealt with. An example of entry and exit from sub-routines will now be considered in order to illustrate this facility.

A set of standard sub-routines for performing such operations as multiplication, division, and input and output scale conversion, are held in the main store of the machine. Each such sub-routine has a different address indicator associated with it. The second part of the address indicator associated with a sub-routine contains the address of the first instruction of the sequence of instructions which form the sub-routine. Consequently, a sub-routine may be brought into the main programme at any point simply by specifying that, at that point, control is changed from the address indicator associated with the main programme to that associated with the required sub-routine. At the same time as the new address indicator is brought into use, the address of the previous indicator is entered into the first part to provide the necessary information to enable the main programme to be re-entered at the proper point after completion of the sub-routine.

It will be assumed that after obeying the instruction in storage location 0052, it is desired to enter a sub-routine. It will also be assumed that the address indicator associated with this sub-routine is held in storage location 0019. The instruction held in storage location 0053 has, for example, the value 0047 in the function field, the value 0000 in the N field, and the value 0019 in the X field. The function significance of an instruction of this form is "Jump to the address indicator stored at the address in the X field."

*A beat* (*3rd*).—During this beat of the next operation cycle, the second part of the address indicator in location 0018 is read into the store register, and the address of the next required instruction, that in location 0053, is transferred, as previously described, into the A register 4 (FIGURE 1). The address indicator is returned to the store with the second part modified to 0054. Thus at the end of the A beat the A register 4 is set to 0053.

*B beat* (*3rd*).—The first two steps of this beat proceed in the manner previously described and result in the next required instruction being trfansferred from the store to the store register and preserved in the store. The third step of the B beat differs from that previously described as the result of the decoding of the function digits 0047. This form of instruction produces a signal on the control line 47 (FIGURE 2) with the result that AND gate 46 is closed. AND gate 49 is opened directly in response to the signal on line 47 and an OR gate 72 passes a signal from the line 47 to open the AND gate 48. Thus the output on line 45 from the B3 stage 12 of the shifting register is passed to OR gates 16 and 31 to cause the contents of the P register 6 (FIGURE 1) to be transferred into the more significant half of the store register. The next step of the B beat causes the B4 stage 12 (FIGURE 2) to produce an output on line 73, which is applied to AND gates 74 and 75. The gates 74 and 75 are both opened by the signal on control line 47. The gate 74 passes the output to OR gates 38 and 17 which respectively allow the contents of the less significant half of the store to be read out and written into the A register. The gate 75 passes the output to OR gate 42 which allows the P register to receive the transferred information at the same time. Thus, at the end of the B beat, the instruction from storage location 0053 has been read into the store register 2 and the function field digits 0047 of this instruction have been transferred to the F register 7; the X field digits (0019) of the instruction have been transferred to the A register 4 and the P register 6; the instruction has been returned to the store with X field unmodified; and the previous contents of the P register 6 have been transferred to the upper half of the store register. The store register now contains the address of the old address indicator in its upper half and the address of the new address indicator in its lower half.

*C beat* (*3rd*).—During the first step of this beat, the new address indicator in location 0019 (specified by the A register) is read out from the store under control of the C1 stage 12 and its associated output line 53. However, the controlling circuit is modified by the presence of the signal on the control line 47. This signal, applied through inverter 50 holds the gate 54 closed. The gate 54, it will be recalled, allows reading from the more significant half of the store into the corresponding half of the store register by controlling the OR gates 24, 25 and 31. Hence, only the less significant half of the selected location of the store is transferred into the store register and the more significant half of the register remains unchanged, so that the store register now contains the address of the previously used address indicator, namely 0018, in the upper part, and the address, say 0080, of the first instruction of the sub-routine associated with the address indicator from location 0019, in the lower part. The second step of the C beat is rendered effective by the signal on the control line 47 opening an AND gate 77 associated with output line 78 of the C2 stage 12. The output from gate 77 is applied to OR gates 17, 24, 26, 37 and 38 to cause the contents of the store register to be returned to the store. The cycle is now complete, since the upper part of the new address indicator now contains the address of the previously used indicator and the P register has been set to the address of the new indicator.

The instruction just obeyed was not an arithmetic instruction and in consequence no signal appeared on control line 59 to set the trigger 58. Thus, the gate 56 remained closed and the gate 57 remained open during this operation cycle, with the result that the recirculation loop of the stepping register in the control device is effectively connected from the C2 stage 12 to the A1 stage 12 and a new operation cycle begins at the next clock pulse. Hence, the next step to be performed is the first step of a new A beat.

The cycle time may be reduced by passing straight from the B beat to the A beat of the next cycle. During this A beat the address indicator from location 0019 is read out in the normal way, but the entry to the upper part of the store register is suppressed. This suppression may conveniently be controlled by a flip-flop (not shown) which is set during the B beat of the jump instruction. The recirculating loop of the stepping register would also be modified to allow skipping of the C beat. Thus, at the end of this modified A beat the contents of the store register will be the same as at the end of the C beat in the first mode of operation.

The sequence of operations forming the sub-routine will now be carried out in a manner similar to that already described for the main programme. When the sub-routine has been completed it is necessary to return control to the main programme. Also, the second part of the current address indicator has been successively modified as the sequence of instructions forming the sub-routine was carried out, and it is necessary to return this part to its original value, so that the sub-routine may be used again. Both these operations are carried out under control of the last instruction in the sub-routine. This instruction will, for example, have the value 0067 in the function field, the value 0000 in the N field, and the value 0080 in the X field. The significance of this instruction is "Jump to the previous address indicator and reset the second part of the current address indicator to the value of the X field." The value of the X field is, of course, the address previously referred to, by way of example, as being the address of the first instruction of the sub-routine associated with the indicator held in storage location 0019, so that after execution of the current instruction the second part of the current address indicator will have been restored to its original condition.

In the last operation cycle of the sub-routine the current address indicator is read out from the store during the A beat in the usual way, and the instruction specified by it is extracted from the store during the first step of the B beat of the cycle. During the second step of the B beat the function digits are read into the F register, following the usual manner of operation. In this case, however, the X field is not to be read into the A register, since for this instruction it represents an operand and not an address. Operations during the remainder of the B beat are conditioned by a signal on a control line 67 from the function decoder 8, this signal being present as the result of decoding the function digits 0067. Thus, during the third step of the B beat, the line 45 from the B3 stage 12 carries an output in the usual way. This output is applied to the AND gates 46, 48, and 49 as before. In the present instance, however, only the gates 46 and 48 are open and resultant signals from these gates are applied to OR gates 16 and 17, which allows the contents of the P register to be transferred into the A register. This has the effect of again putting the address (0019) of the current address indicator into the A register. The fourth step of the B beat is ineffective during the cycle of operation since the gates 74 and 75 connected to the output line 73 from the associated stepping register stage 12 are closed.

The first step of the C beat is again modified by the presence of the signal on the control line 67. During this step the output on line 53 from the C1 stage 12 is applied directly to OR gates 17 and 28 to select the store address, but reading from the selected location (0019) is modified by AND gate 55 which in maintained closed by the signal on line 57. Thus, the AND gate 54 remains open to allow the output on line 53 to pass to OR gates 24, 25 and 31 to cause the more significant half of the selected location to be transferred into the more significant half of the store register. At the same time the closing of AND gate 55 allows only the OR gate 26 associated with the less significant half of the selected location to receive a signal. At the same time a further AND gate 76 is opened by the signal from control line 67 to allow an output from the line 53 to pass to OR gate 38. Hence the contents of the less significant half of the store register are transferred into the less significant half of the store location 0019. At the end of this step, therefore, the contents of both location 0019 in the store and the store register consist of the address of the original NIAC (namely 0018) in the upper part and the X field digits in the lower part. The lower part of the storage location and the store register therefore contain the initial instruction address originally held by the indicator.

The final step, C2 of this beat is controlled as previously described by the output on line 78 from the appropriate stage 12. This iutput is applied to AND gates 77 and 79. The gate 77 is closed at this time but the gate 79 passes a signal to OR gates 37 and 42 to cause the transfer of the original NIAC address from the upper part of the store register into the P register in readiness for the next operational cycle. Thus the P register has again been loaded with the NIAC address referring to the main programme and the instruction address stored therein will be that required for the next main programme step.

The upper part of the address indicator in location 19 still contains the address of the last indicator which called it. This information may be useful if it is necessary to trace the sequence of operations preceding the occurrence of a fault on the machine. Since the last instruction was non-arithmetic, the next operation cycle commences immediately after the end of the second step of the C beat in the manner previously described.

It will be appreciated that the procedure described above is not limited to transferring from the main programme to a sub-routine, and back again. For example, it is quite possible for the main programme to call a first sub-routine which calls a second sub-routine, which in turn calls a third sub-routine, with return to the main programme occurring after completion of the third sub-routine. Equally the main programme may call a first sub-routine in the middle of which a second sub-routine is called. Control is returned to the first sub-routine on completion of the second sub-routine, and control is returned to the main programme on completion of the first sub-routine. The address indicator system greatly simplifies the writing of programmes, since each time a sub-routine is required, it is necessary only to write into the programme at that point the address of the address indicator which is associated with the required sub-routine. Furthermore, since the address indicators are held at storage locations of the main store, the number of address indicators available is limited only by the amount of storage which can be allocated for programme control purposes in any particular problem, and not by the structure of the machine.

The address indicator system is also very convenient for use with a computer which includes a programme interrupt feature. Each magnetic tape deck, input card reader, output printer, or other device which can call for interruption of the main programme is provided with an indicator in the conventional manner. Each indicator is set when the tape deck or other device associated with it requires an interruption in the programme. When the control circuits allow a set indicator to interrupt the programme, the indicator produces the same effect as though the instruction "Jump to address indicator" had been written into the programme, where X is the address of the address indicator associated with the sub-routine rerequired for servicing the interrupting device. Consequently, the machine will follow the required sub-routine and then return to the main programme by following a procedure similar to that already described for transfer between the main programme and sub-routine. A set indicator with a higher priority may interrupt the sub-routine which has been called by another indicator with a further sub-routine, in the manner referred to earlier.

It has already been pointed out that the value in the N field of an instruction controls the manner in which the instruction is modified before it is returned to the store after use. In the special case of an unconditional jump instruction for which the value in the N field is 127, the instruction is not only returned to the store in unmodified form, but the instruction itself is not obeyed. Hence, if the instruction is initially written in the programme with the value 124 in the N field, the instruction ill be obeyed three times, the value in the N field being creased by 1 each time the instruction is obeyed. The ›urth time the instruction is called, the N field will now ›ntain the value 127 and the instruction will not be ›eyed, so that no jump occurs and the next instruction · be selected will be that following the jump instruction. Thus the N field can be used in the manner of a counter cause an instruction to be obeyed a specified number of nes, before control passes to the next following in-ruction.

In leaving a sub-routine the address indicator asso-ated with it is returned to its original condition, but if e sub-routine contains instructions of which the N field ıs been used for counting purposes, then these fields will ıve been altered after use of the sub-routine. One or ore instructions are included in the sub-routine, for ;ample, immediately preceding the jump instruction hich provides for leaving the sub-routine, for the sole ırpose of returning modified instructions to their original ›rm. The X field of such a modifying instruction con-ins the address of the instruction which is to be modified ıd the N field of the instruction contains the comple-ent to 127 of the value to which the N field of the odified instruction is to be returned. This procedure ıables both the address indicator and the instructions of sub-routine to be returned to their original form after ›e.

The invention has been described as applied to a com-ıter utilising a magnetic matrix store in which the read ıd write cycles are interlocked. The invention is equal- applicable to machines using other forms of storage, ıt it will be appreciated that the operation cycles may ell have a different number and/or sequence of beats in :der to utilise the facilities of a particular kind of store ı the best advantage. Furthermore, more than one store ay be used. For example, the instructions and address ıdicators could be held in one store and information to : processed could be held in another store.

I claim:

1. Data processing apparatus controlled in operation √ sequences of program instructions, including storage .eans for program instructions, said storage means having plurality of individually addressable storage locations . which at least two partial programs of instructions are ored; at least two independently selectable program in-ruction address indicators each associated with a cor-sponding partial program respectively and each con-.ining an effective and an ineffective storage location, ıid effective storage location specifying the address of a ·ogram instruction; means for selecting one of said ·ogram instruction address indicators; means for reading ıt the program instruction from the address specified in ıid effective storage location of the selected indicator; ıeans for registering the program instruction read out; ıd control means normally responsive to a registered ıstruction to perform the operation specified thereby, to ıodify the address specified in said effective location of ıe selected indicator to specify the address of the next .struction in sequence of the associated partial program, ıd to condition the selecting means to reselect the same ·ogram instruction address indicator; said control means ırther including means for identifying special instruc-ons of a first and a second form respectively and means ·sponsive to such identifying means for modifying the peration of said control means in response to an in-ruction of said first form to condition said selecting ıeans to select a different program instruction address ıdicator and to enter an identification of the previously ·lected program instruction address indicator into the .effective part of the currently selected program instruc-on address indicator, and in response to said second form f instruction to interrogate said ineffective part of the ırrent program instruction address indicator to condition ıid selecting means to select the program instruction ldress indicator identified therein.

2. Data processing apparatus controlled in operation by sequential instructions as defined herein, including main storage means having a plurality of individually addressable storage locations in which at least two partial programs of instructions are stored, the instructions of each of the partial programs respectively being stored in storage locations having sequential addresses; at least two independently selectable program instruction address indicators respectively associated one with each of the partial program instruction sequences, each program instruction address indicator including an effective storage part and an ineffective storage part, the effective part containing the address of the next required instruction of the associated partial program; means for selecting one of the program instruction address indicators; means for reading out the program instruction stored in the location specified by the address contained in the effective storage part of the selected address indicator; means for registering the instruction read out; and control means normally effective in response to a registered instruction to perform the operation specified thereby, to add unity to the address contained in said effective storage part of the selected address indicator to specify the address of the next sequential main storage location, and to condition the selecting means to reselect the same program instruction address indicator; said control means further including means for identifying special instructions of a first and a second form respectively and means responsive to said identifying means for modifying the operation of said control means in response to an instruction of said first form to condition said selecting means to select a different program instruction address indicator and to enter an identification of the previously selected program instruction address indicator into the ineffective part of said different program instruction address indicator, and in response to said second form of instruction to derive from the ineffective part of the current program instruction address indicator the identification of a previously used program instruction address indicator and to condition the selecting means to reselect said previously used indicator.

3. Data processing apparatus controlled in operation by sequential instructions as defined herein, including common storage means having a plurality of individually addressable storage locations, in which at least two partial programs of instruction and at least two program instruction address indicators are stored, the instructions of each of the partial programs respectively being stored in locations having sequential addresses, and in which the address indicators are stored in locations separate from the program instruction sequence, the address indicators being respectively associated one with each program instruction sequence and each including an ineffective part and an effective part, the effective parts respectively initially containing the address of the storage location of the first program instruction of the associated sequence; means for selecting one of the address indicators for reading out the the program instruction stored in the location specified by the address contained in the effective part of the selected indicator; means for registering the instruction read-out; and control means normally effective in response to the registered instruction to perform the operation specified thereby, to add unity to the address contained in said effective part of the selected address indicator to specify the address of the next sequential common storage location, and to condition the selecting means to reselect the same address indicator; said control means further including means for identifying special program instructions of a first and second form respectively and means responsive to said identifying means for modifying the operation of said control means in response to an instruction of said first form to condition said selecting means to select a different address indicator and to enter the address of the storage location containing the previously selected address indicator into the ineffective part of said different address indicator, and in response to an instruction of said second form to derive from the ineffective part of the current address indicator the address of the storage location containing the previously used address indicator and to condition said selecting means to reselect said previously used address indicator.

4. Data processing apparatus controlled in operation by sequential instructions as defined herein, including common storage means having a plurality of individually addressable storage locations, in which at least two partial programs of instructions and at least two program instruction address indicators are stored, the instructions of each of the partial programs respectively being stored in locations having sequential addresses, and in which the address indicators are respectively associated one with each partial program instruction sequence and each includes an effective part and an ineffective part, the effective parts respectively each initially containing the address of that storage location containing the first instruction of the associated sequence; an address register; means associated with said address register for selecting the contents of the storage location specified thereby; an auxiliary address storage register; and means for controlling the apparatus repeatedly to follow a cyclic operating sequence normally consisting of the steps of: transferring the contents of said auxiliary address storage register to said address register to select a first instruction address indicator; transferring the address contained by said effective part of the selected address indicator to said address register to select the next required program instruction; modifying the address contained by said effective part of the selected address indicator by the addition of unity; and registering and performing the operation specified by the selected program instruction; the controlling means further including means for identifying special program instructions of a first and second form respectively and means responsive to said identifying means for modifying the operation of the controlling means duriing the current operating cycle in response to an instruction of said first form to enter the address of a second address indicator into said address register to select the second address indicator; to transfer the contents of said auxiliary address storage register into said ineffective part of the selected second address indicator; and to enter the address of said second address indicator into said auxiliary address storage register; and in response to an instruction of said second form to reselect said second address indicator and to transfer the contents of said ineffective part of the reselected second address indicator into said auxiliary address storage register.

5. Data processing apparatus controlled in operation by sequential instructions as defined herein, including common storage means having a plurality of individually addressable storage locations in which at least two partial programs of instructions and a corresponding number of program instruction address indicators are stored, the instruction of each of the partial programs respectively being stored in locations having sequential addresses, and in which the address indicators are respectively associated each with a corresponding partial program instruction sequence, each address indicator having an effective and an ineffective part, the effective parts respectively each containing the address of that storage location containing the first instruction of the associated partial program sequence; an address register; means associated with said address register for selecting the contents of a storage location thereby; an auxiliary address storage register; and means for controlling the apparatus repeatedly to follow a cyclic operating sequence normally consisting of the steps of: transferring the contents of said auxiliary address storage register to said address register to select a first instruction address indicator; transferring the address contained by said effective part of the selected address indicator to said address register to select the next required program instruction; modifying the address contained by said effective part of the selected address indicator by the addition of unity; and registering and performing the operation specified by the selected program instruction; the controlling means further including means for identifying special program instructions of a first and a second form respectively and means responsive to said identifying means for modifying the operation of the controlling means during the current operating cycle in response to an instruction of said first form specifying the address of the storage location containing a second instruction address indicator to transfer the specified address into said address register to select said second address indicator; to transfer the contents of said auxiliary address storage register into said ineffective part of the selected second address indicator; and to enter the address of said second address indicator into said auxiliary address storage register; and in response to an instruction of said second form specifying the address of the first program instruction of the sequence associated with said second instruction address indicator to transfer the contents of said auxiliary address storage register into said address register to reselect said second address indicator; to transfer the address specified by said instruction of second form into the effective part of the reselected second address indicator; and to transfer the contents of the ineffective part of the reselected second address indicator into said auxiliary address storage register.

6. Data processing apparatus controlled in operation by sequential instructions as defined herein, including common storage means having a plurality of individually addressable storage locations in which at least two partial programs of instructions and a corresponding number of program instruction address indicators are stored, the instructions of each of the partial programs respectively being stored in locations having sequential addresses, and in which the address indicators are respectively associated each with a corresponding partial program instruction sequence, each address indicator having an effective and an ineffective part, the effective parts respectively each holding the address of that storage location containing the first instruction of the associated partial program sequence; an address register; means associated with said address register for selecting the contents of a storage location specified thereby; means for registering the selected contents; an auxiliary address storage register; and means for controlling the apparatus repeatedly to follow a cyclic operating sequence including a recirculating stepping register; program instruction identifying means; and a logical gating network connected to the stepping register to provide data transfer paths selectively operable in response to joint operation of the stepping register and the instruction identifying means, said cyclic operating sequence normally including the steps of: transferring the contents of said auxiliary address storage register to said address register to select a first instruction address indicator; transferring the address held by said effective part of the selected address indicator to said address register to select the next required program instruction; modifying the address held by said effective part of the first address indicator by the addition of unity; and performing the operation specified by the selected program instruction; said identifying means being responsive to the registration of selected program instructions of first and second particular forms respectively to modify the operation of said controlling means during the current operating cycle in response to an instruction of said first particular form specifying the address of the storage location holding a second instruction address indicator to transfer the address specified in the instruction into said address register to select said second address indicator; to transfer the contents of said auxiliary address storage register into said ineffective part of the selected second address indicator; and ɔ transfer the address of said second address indicator into aid auxiliary address storage register; and in response to n instruction of said second particular form specifying ıe address of the storage location holding the first intruction of the sequence associated with said second intruction address indicator to transfer the contents of said uxiliary address storage register into said address regisɛr to reselect said second address indicator; to transfer ıe address specified by said instruction of said second articular form into the effective part of the reselected second address indicator; and to transfer the contents of the ıeffective part of the reselected second address indicator ıto said auxiliary address storage register.

References Cited by the Examiner

UNITED STATES PATENTS

| | | | |
|---|---|---|---|
| 3,015,441 | 1/1962 | Rent et al. | 235—157 |
| 3,036,773 | 5/1962 | Brown | 235—157 |

OTHER REFERENCES

Proceedings of the Eastern Joint Computer Conference, pp. 75–77, 1959.

ROBERT C. BAILEY, *Primary Examiner.*

MALCOLM A. MORRISON, *Examiner.*

P. L. BERGER, *Assistant Examiner.*